No. 696,242. Patented Mar. 25, 1902.
C. K. JOHNSON.
PLOW.
(Application filed June 1, 1901.)
(No Model.)
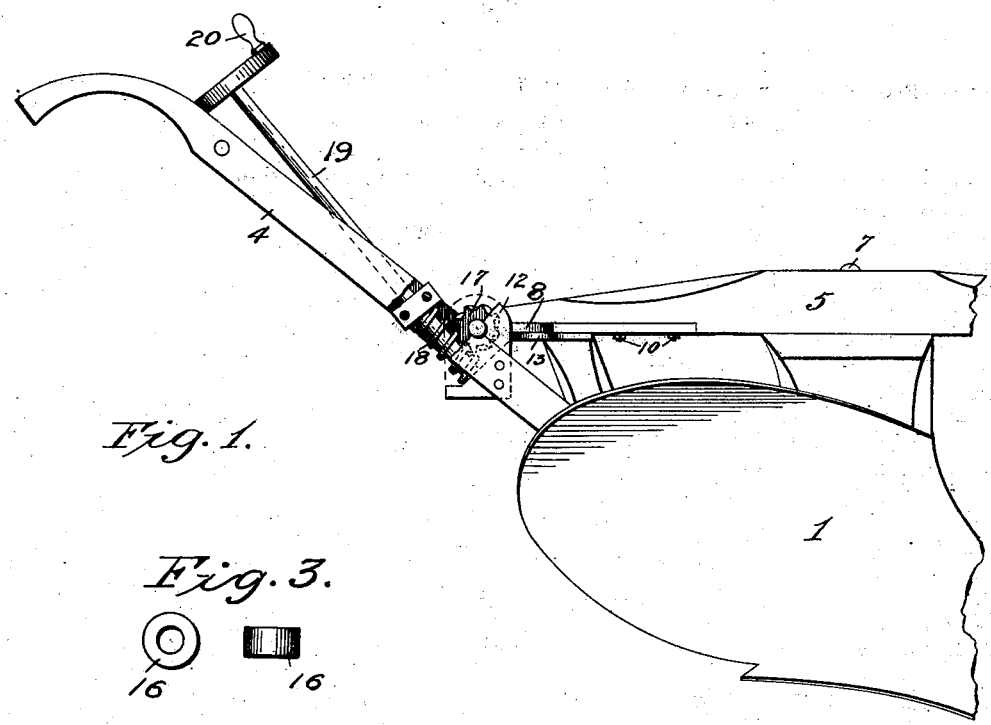
Fig. 1.
Fig. 3.
Fig. 2
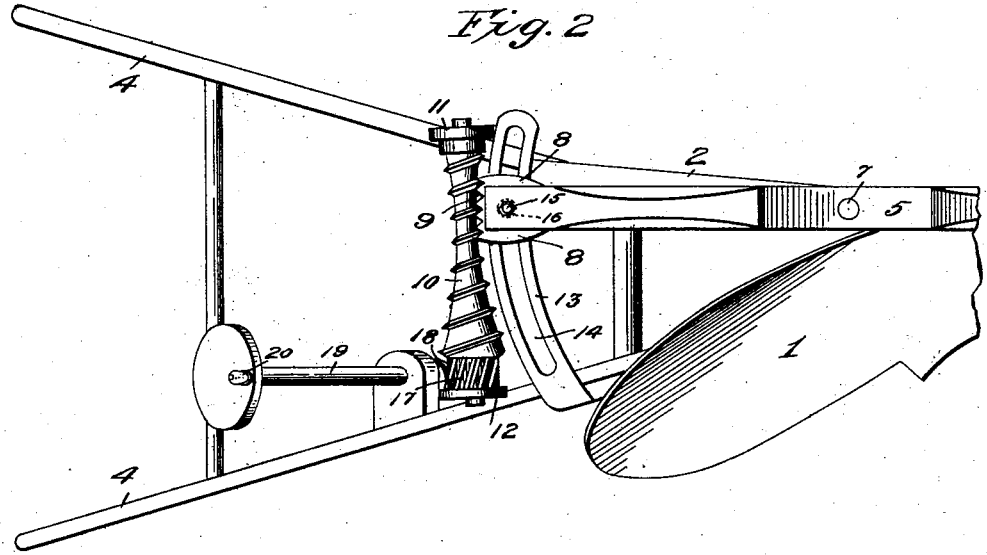
Witnesses:
Inventor
Charles K. Johnson.
per
Att'y

UNITED STATES PATENT OFFICE.

CHARLES K. JOHNSON, OF NEAR WARRENTON, VIRGINIA.

PLOW.

SPECIFICATION forming part of Letters Patent No. 696,242, dated March 25, 1902.

Application filed June 1, 1901. Serial No. 62,727. (No model.)

*To all whom it may concern:*

Be it known that I, CHARLES K. JOHNSON, a citizen of the United States, residing near Warrenton, in the county of Fauquier and State of Virginia, have invented new and useful Improvements in Plows, of which the following is a specification.

My invention relates to the class of plows, and has for its object to provide an implement of this class which can be easily and quickly adjusted so as to take more or less land, as occasion may require.

A further object of my invention is to provide a plow the beam of which may be shifted while plowing so as to enable the plow to take more or less land without stopping the plow or in any way interfering with the team.

With these objects in view my invention consists in the novel arrangement of my beam-shifting apparatus.

My invention consists in certain other novel features of construction and in combination of parts which will be hereinafter fully described, and afterward specifically pointed out in the appended claims.

Referring to the accompanying drawings, Figure 1 is a side elevation of my plow, the forward portion being broken away in order to enlarge the view. Fig. 2 is a top plan of the same. Fig. 3 shows the roller 16 in plan and in elevation.

Like numerals of reference indicate the same parts throughout the several figures, in which—

1 is the plowshare; 2, the landside; 4, the plow-handles, and 5 the plow-beam. The beam 5 is pivoted at 7 and is provided at its rear end with a plate 8, which form the teeth 9, said plate being securely bolted to the beam 5, as shown.

10 is a worm-screw journaled at either end in the bearing-pieces 11 and 12, which are securely bolted to the plow. The circumference of said worm-screw 10 increases from the center to the ends thereof, the line formed thereby equal to an arc of a circle whose radius would be the distance from the plow-beam pivot 7 to the threads of the worm-screw 10. Secured directly in front of the worm-screw 10 is a horizontal plate 13, having a curved slot 14 therein. The bolt 15 in the rear end of the plow-beam 5 travels in said slot and is provided with a roller 16 to reduce friction. The teeth 9 mesh with the worm-screw 10, and said worm-screw is provided at one end thereof with a spiral gear 17, which mesh with a worm-screw 18, suitably secured to the plow in an upright position. Connected to said worm-screw 18 or integral therewith is a shaft 19, having a crank 20 at the top thereof located in close proximity to one of the plow-handles 4.

It is of course understood that the crank 20 and worm-gearing can be placed on the right or left side of the plow, thus providing for right or left hand operation.

Having thus described my invention, its operation is as follows: Should it for various reasons be desired to take more or less land while plowing, the plowman turns the crank 20. This operates the worm-gearing, which turns the worm-screw 10, and as the teeth 9 of the plate 8 mesh with the said worm-wheel said plate and end of plow-beam is shifted. Said beam being pivoted at a point intermediate the ends thereof, its forward end and clevis is shifted from right to left, as is obvious.

Having thus described my invention, I do not wish to be understood as limiting myself to any particular form of worm-gearing nor to any particular manner of attaching and operating the same, as I consider myself entitled to all such modification in form and construction.

What I claim as new, and desire to secure by Letters Patent of the United States, is—

1. In a plow the combination of the beam, teeth at the rear end thereof, a worm-screw adapted to mesh with said teeth, a spiral gear on said worm-screw, and an upright worm-screw substantially as described.

2. In a plow the combination of the beam, teeth at the end thereof, a worm-screw adapted to mesh therewith, the circumference of which increases from the center to the ends thereof, and means for turning said screw, substantially as described.

3. In a plow the combination of the beam a worm-screw secured behind said beam, a spiral gear on said screw, an upright worm-screw adapted to mesh with said spiral gear and means for guiding said beam substantially as described.

In testimony whereof I affix my signature in presence of two witnesses.

CHARLES K. JOHNSON.

Witnesses:
T. TOWSON SMITH,
W. E. BISHOP.